No. 847,232. PATENTED MAR. 12, 1907.
D. BUHLMANN.
APPARATUS FOR COOLING, MOISTENING, AND PURIFYING THE AIR IN ROOMS.
APPLICATION FILED FEB. 23, 1905.

Witnesses.

Inventor.

UNITED STATES PATENT OFFICE.

DORA BUHLMANN, OF KAISERSLAUTERN, GERMANY.

APPARATUS FOR COOLING, MOISTENING, AND PURIFYING THE AIR IN ROOMS.

No. 847,232.　　　　　Specification of Letters Patent.　　　Patented March 12, 1907.

Application filed February 23, 1905. Serial No. 246,918.

*To all whom it may concern:*

Be it known that I, DORA BUHLMANN, a subject of the German Emperor, residing at Kaiserslautern, Germany, have invented a new and useful Apparatus for Cooling, Moistening, and Purifying the Air in Rooms, of which the following is a specification.

My invention relates to an apparatus which while cooling and moistening the air of a room removes from it noxious gases, dust, and other impurities. These advantages are obtained by causing the air to circulate through the apparatus, into which it is drawn by means of a rotary ventilating-pump or similar device, and from which it issues in a cooled, purified, and moistened state after coming in contact with certain substances of a refrigerating nature stored in the chambers or compartments of the said apparatus.

Figure 1:
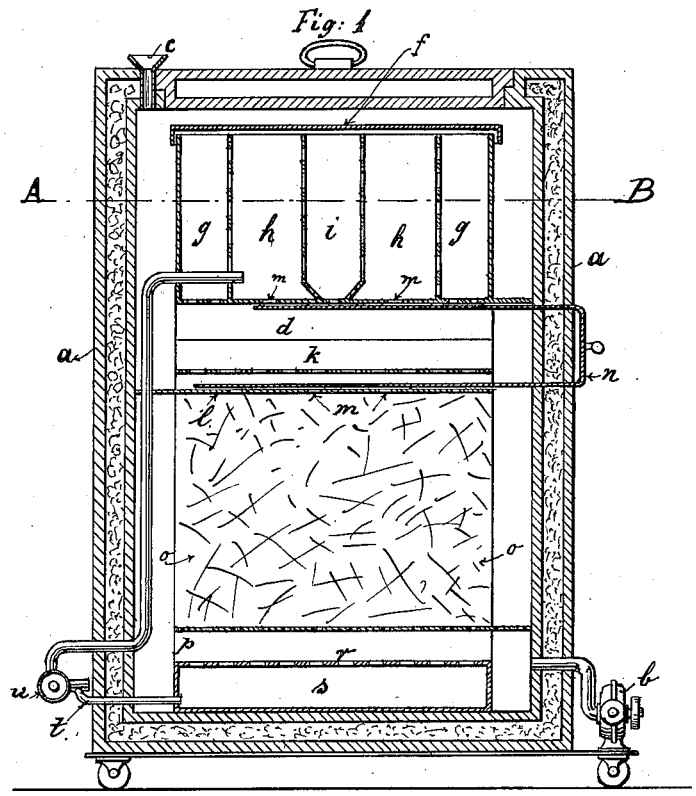
Figure 2:
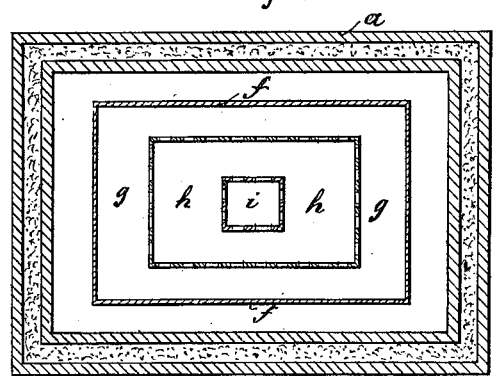

An apparatus constructed according to the principles of my invention is represented in the accompanying drawings, wherein Figure 1 is a longitudinal section, and Fig. 2 a cross-section taken on the line A B in Fig. 1.

Similar letters refer to similar parts in both views.

The case $a$, made of any material that is a non-conductor of heat and can be suitably employed for such a purpose, is constructed, as shown, with double walls, and the space between the outer and inner walls may be filled with any suitable light insulating substance—for instance, silk-waste—the object being to prevent the air within the apparatus from being affected by the temperature of the outer air. A rotary ventilating-pump $b$ is provided for drawing air from the room into the apparatus through the opening $c$.

Lodged within the case $a$ is the refrigerating device $f$, constituting three distinct vessels $g\ h\ i$. The vessel $g$ is intended to contain ice, the vessel $h$ water, and the vessel $i$ salt, ammoniac nitrate, or other substance or substances which may be deemed to have a cooling, refreshing, or puryifying effect on the air passing through the apparatus. The walls of the vessels $h$ and $i$ are perforated, as also are the inner walls and the bottom of the vessel $g$.

$d$ indicates an air-passage, and $k$ a water-chamber with a perforated bottom intended to be partly filled with salt, ice, or any suitable substance or substances which may be deemed to have a cooling, refreshing, or purifying effect on the air passing through the apparatus. The refrigerator $f$ and the partition $l$ below the water-chamber $k$ are provided with openings $m$. A double sliding device $n$, which can be actuated from outside the case $a$, serves to close or partly close these openings.

$o$ indicates a receptacle, which may consist merely of an open framework, or it may be any open-sided structure through which air can freely pass, resting on a platform or provided with a bottom, the platform or the bottom, as the case may be, being perforated to allow water to pass freely from this receptacle into the lowermost chamber or tank $s$ of the apparatus. In the receptacle $o$ is loosely piled a sufficient quantity of dried branch clippings or twigs preferably taken from alder or beech trees, in such a way that the water falling from the upper compartments of the apparatus may drip from branch to branch.

$p$ is an air-passage, the perforated floor or platform $r$ of which is intended to be covered with a layer of ice.

$t$ is a pipe for restoring to the vessel $h$ by means of a force-pump $u$ the water collecting in the tank $s$.

The apparatus may be provided with wheels or rollers, as shown in the drawings, to facilitate its transport from room to room.

The apparatus operates as follows: The outer air is drawn into the case $a$ by the action of the ventilator-pump $b$ (to which any suitable motive power may be applied) through the opening $c$. More than one such opening may be provided. The current of air passes downward and through the passage $d$ while being cooled by the proximity of the ice deposited in the vessel $g$ and the water in the vessel $h$, as well as by the refrigerating mixture of ice-water and salt contained in the chamber $k$. The air is still further cooled by its passage through the receptacle $o$, into which falls the fluid from the chamber $k$. Here, also, it is moistened by direct contact with this fluid, while the branch clippings or twigs, lodged for this purpose in the said receptacle $o$, rid it of dust and other impurities. The moist purified air then passes over the layer of ice in the passage $p$, whereby its temperature is still further reduced before issuing from the apparatus by the action of the ventilator-pump b to reënter the room from which it was originally drawn or to pass into another room if suitable means of communication are provided. The melted ice from g, the water from h, and the salt from i passing gradually from these compartments, through the bottom-openings provided for this purpose, into the chamber k after mingling with one another through the side perforations in said compartments constitute the refrigerating mixture. Although alder and beech trees are mentioned above owing to the pliancy of their small wood, any suitable branch clippings, twigs, brambles, or a suitable artificial structure—say of wire—on which the water may drip can be employed to the same end.

Having described my invention, what I claim, and desire to secure by Letters Patent of the United States, is—

1. An apparatus for cooling, moistening and purifying the air in rooms, consisting of an outer case a having double walls made of insulating material, the space between them containing an insulating medium, a cooling vessel f provided with openings in its bottom and divided into compartments by perforated partitions allowing a mingling of their contents, an air-passage d below this vessel, a tank k with a perforated bottom below this passage, a sliding device n, whereby the openings immediately above and below it may be stopped, or partly stopped, a perforated partition below this device, an open-sided receptacle o below this partition constructed to allow free ingress and egress of water and air, an air-passage p below this receptacle with a perforated floor, a tank s below this passage, a force-pump u and a pipe t for raising water from this tank to the vessel h and a rotary ventilating-pump b to draw air through one or more openings into the apparatus, the whole substantially as described and as shown in the accompanying drawings.

2. In an apparatus for cooling, moistening and purifying the air in rooms, the combination with an outer case a having double walls made of insulating material, the space between them containing an insulating medium, of a cooling vessel f provided with openings in its bottom and divided into compartments by perforated partitions, the outermost compartment g being destined to contain ice, the intermediate compartment h to contain water and the innermost compartment i to contain salt, ammonia nitrate, or other refrigerating substance, an air-passage d below the vessel f, a tank k with a perforated bottom destined to receive substances falling from the vessel f and to hold a layer of ice or other suitable refrigerating substances, a sliding device n for closing or partly closing the openings m immediately above and below it, an open-sided receptacle o below, a perforated partition l intervening between it and the tank k, said receptacle o containing portions of tree-branches, brambles, or an equivalent artificial structure and constructed to allow the free passage through it of water and air, an air-passage p below this receptacle, with a perforated floor on which may be deposited a layer of ice, a tank s below this passage, a force-pump u and a pipe t for raising water from this tank to the vessel h and a rotary ventilating-pump b to draw air through one or more openings into the apparatus, the whole substantially as described and as shown in the accompanying drawings.

In testimony whereof I have hereunto set my hand in presence of two witnesses.

DORA BUHLMANN.

Witnesses:
BERNHARD FELD,
MICHAEL ZIMMERMANN.